(12) United States Patent
McIntyre et al.

(10) Patent No.: US 12,419,294 B1
(45) Date of Patent: Sep. 23, 2025

(54) TACKLEBOX

(71) Applicants: Scott McIntyre, Peyton, CO (US); Landon McIntyre, Peyton, CO (US)

(72) Inventors: Scott McIntyre, Peyton, CO (US); Landon McIntyre, Peyton, CO (US)

( * ) Notice: Subject to any disclaimer, the term of this patent is extended or adjusted under 35 U.S.C. 154(b) by 0 days.

(21) Appl. No.: 18/415,828

(22) Filed: Jan. 18, 2024

(51) Int. Cl.
*A01K 97/06* (2006.01)

(52) U.S. Cl.
CPC .................... *A01K 97/06* (2013.01)

(58) Field of Classification Search
CPC ....................................................... A01K 97/06
See application file for complete search history.

(56) References Cited

U.S. PATENT DOCUMENTS

| | | | |
|---|---|---|---|
| 2,674,826 A * | 4/1954 | Busse | A01K 97/06 206/315.11 |
| 3,151,790 A | 10/1964 | Mavrakis | |
| 3,399,939 A * | 9/1968 | Anderson | A01K 97/06 206/315.11 |
| 3,680,750 A | 8/1972 | Franco | |
| 4,020,584 A | 5/1977 | Michal | |
| 4,697,379 A | 10/1987 | McPhaul | |
| 5,505,354 A * | 4/1996 | Hutton | A01K 97/06 224/183 |
| 5,526,927 A | 6/1996 | McLemore | |
| 7,478,500 B1 | 1/2009 | Pollock et al. | |
| 7,997,024 B2 | 8/2011 | Gesik | |
| 9,288,975 B1 * | 3/2016 | Arias | A01K 91/06 |
| 10,130,088 B2 | 11/2018 | Dollahite | |
| 11,122,788 B2 | 9/2021 | Noel, Sr. | |
| 2011/0005121 A1 * | 1/2011 | Gelber | A01K 97/06 43/57.1 |
| 2011/0214336 A1 * | 9/2011 | Hoover | A01K 97/06 43/54.1 |
| 2015/0096221 A1 * | 4/2015 | Marek | A01K 97/06 43/54.1 |
| 2019/0000058 A1 * | 1/2019 | Murar | A01K 97/06 |

* cited by examiner

*Primary Examiner* — Kimberly S Berona
*Assistant Examiner* — Steven J Shur
(74) *Attorney, Agent, or Firm* — Cramer Patent & Design, PLLC.; Aaron R. Cramer

(57) ABSTRACT

Embodiments of the present disclosure include a tacklebox, including a base, a first wall, a second wall, a third wall, and a fourth wall, each of the walls having a bottom end attached to or otherwise affixed to a perimeter of the base and upstanding therefrom. Embodiments may also include a lid connected with a top of the third wall via a hinged connection. The first wall, the second wall, the third wall, and the fourth may have a plurality of magnetics disposed about each wall face. The magnets may be neodymium.

2 Claims, 4 Drawing Sheets

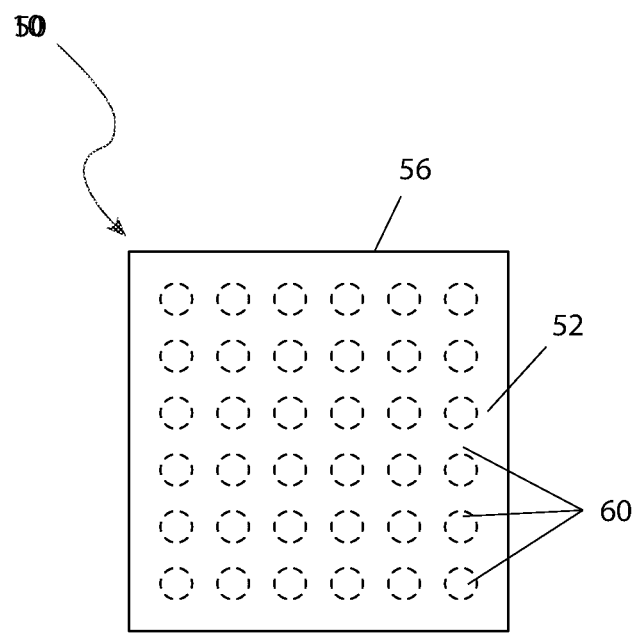
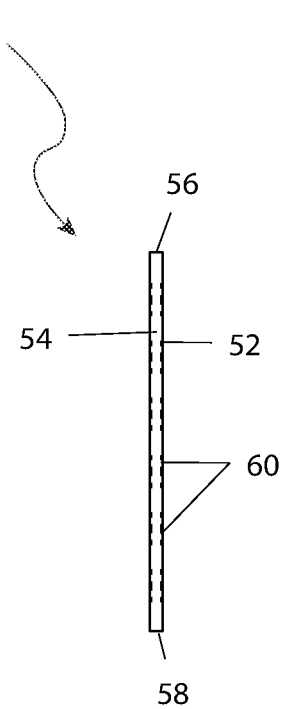
FIG. 5
FIG. 6
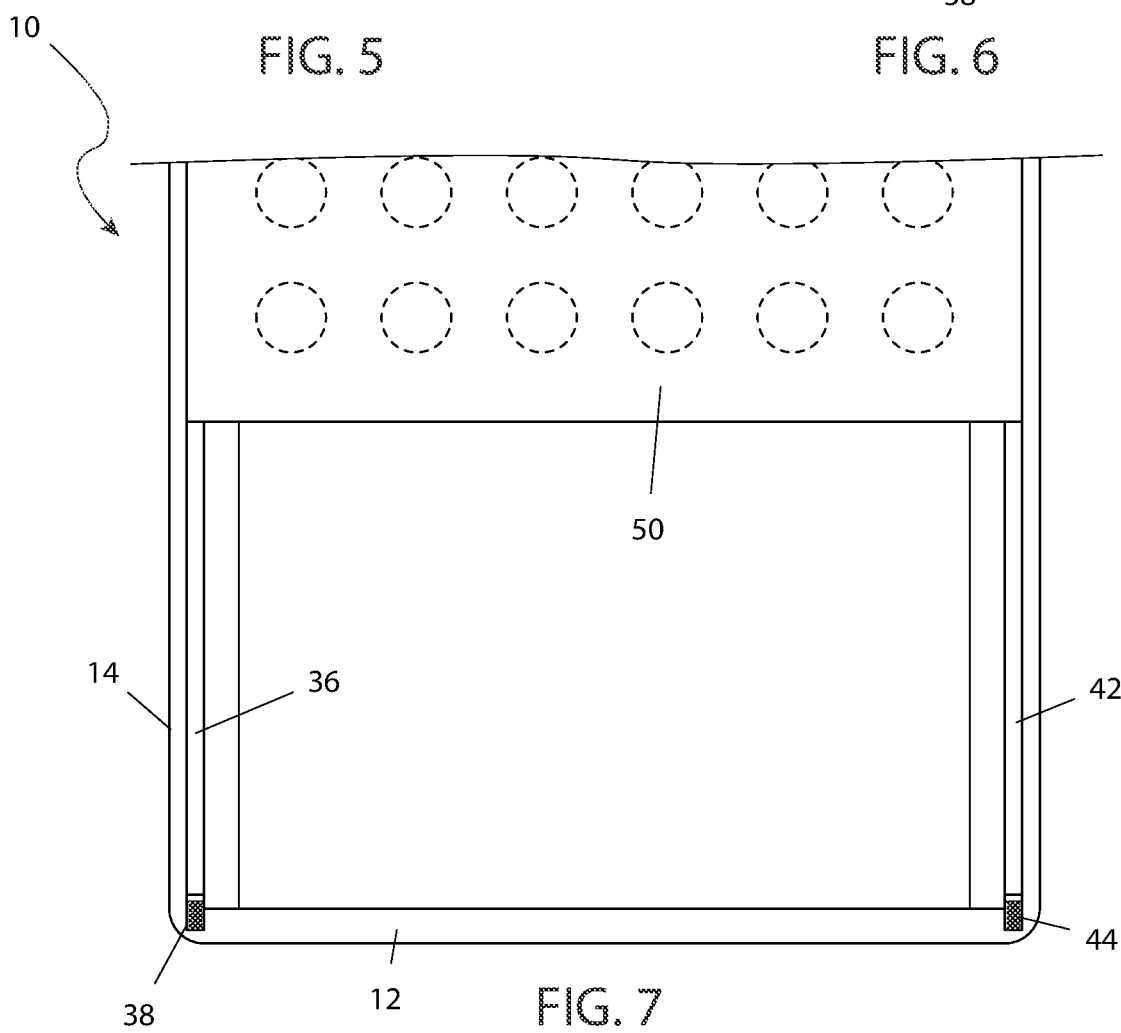
FIG. 7

TACKLEBOX

RELATED APPLICATIONS

None.

FIELD OF THE INVENTION

The present invention pertains in a broad sense to a tacklebox and in a specific sense to a tacklebox having improved features.

BACKGROUND OF THE INVENTION

When going fishing, it is quite necessary for an angler to have a tacklebox that can be relied on. Traditional tackleboxes, on the other hand, frequently come with their own share of difficulties. Because they are large and unwieldy, it can be a headache to carry them around and keep track of them, particularly on extended fishing trips or while going to several fishing areas. Because of this, having a tacklebox that is both lightweight and equipped with magnets is essential.

Anglers look for lightweight tackleboxes for a variety of reasons, but one of the most important ones is the ease they provide. Whether you are hiking to a remote fishing place, wading across a stream, or simply moving from spot to spot along the shoreline, fishing requires movement. Carrying heavy equipment can rapidly become exhausting and drain your energy, which can diminish the enjoyment you get out of fishing. Your ability to move around easily and in comfort, as well as the general enjoyment you get out of fishing, are both increased by a tacklebox that is lightweight.

A tacklebox with magnets offers a solution to the common problem of tangled fishing gear, in addition to being lightweight and offering portability benefits. Getting tangled fishing lines, hooks, and lures untangled may be an annoying and time-consuming process that wastes otherwise productive fishing time. You are able to successfully avoid tangles and disorganization with your fishing gear by including magnets into the design of your tacklebox.

Neodymium magnets are renowned for their incredible strength despite their small size, and this strength ensures that your fishing needs will continue to remain safely in place thanks to their intense attraction. While many tackleboxes exist which offer magnets there are none that offer a lightweight solution the current device offers. The use of the improved tacklebox addresses the need for a lightweight tacklebox with neodymium magnetic features that is both cost effective, functional, and visually attractive.

SUMMARY OF THE INVENTION

Embodiments of the present disclosure may include a tacklebox, including a base, a first wall, a second wall, a third wall, and a fourth wall, each of the walls having a bottom end attached to or otherwise affixed to a perimeter of the base and upstanding therefrom. Embodiments may also include a lid connected with a top of the third wall via a hinged connection.

In some embodiments, the first wall and the third wall may be parallel to each other, and the second wall and the fourth wall may be parallel to each other. Embodiments may also include each of the walls that have a continuous flat and vertically planar inner surface with a rounded portion. In some embodiments, the continuous flat and vertically planar inner surface and a plane may be located at a plurality of coextensive upper perimeter edges of the walls that defines a cavity.

In some embodiments, the continuous flat and vertically planar inner surface and a plane may be located at the coextensive upper perimeter edges of the walls that defines the cavity. In some embodiments, the cavity may be configured for disposal of a plurality of partitions removably placed therein. In some embodiments, the continuous flat and vertically planar inner surface inner surface of the first wall includes at least one first groove.

In some embodiments, the tacklebox, according to may include at least one second groove located on the continuous flat and vertically planar inner surface inner surface of the third wall. Embodiments may also include a number of the first grooves may be equal to a number of the second grooves. In some embodiments, the first grooves and the second grooves may be in coalignment and each receive a portion of opposing sides of the partitions.

In some embodiments, the first grooves and the second grooves each depend inwardly on the continuous flat and vertically planar inner surface inner surface to a coextensive depth. Embodiments may also include an inner surface wall of the respective grooves may be snugly and securely fit the opposing sides of the partitions. In some embodiments, the first groove may be configured to receive a corner of an engaging side of each of the partitions first end and the second groove may be configured to receive a corner of an engaging side of each of the partition's second end.

Embodiments may also include each of the partitions translates along the grooves and engages with a respective first advancing means or a second advancing means to lock the respective advancing means. In some embodiments, the partitions includes a partition first surface and a partition second surface each extending between a partition first end and a partition second end.

In some embodiments, the partition first surface and/or the partition second surface includes a plurality of magnets. In some embodiments, the magnets may be a plurality of neodymium magnets. In some embodiments, the lid may be removably connected with an opposing top of the first wall with such a removable connection means. In some embodiments, the removable connection means may be a magnetic connection. In some embodiments, the removable connection means may be a key and key slot connection.

BRIEF DESCRIPTION OF THE DRAWINGS

These and other features, aspects, and advantages of the present disclosure will become better understood with regard to the following description, appended claims, and accompanying drawings where:

FIG. 5 is a front view of a partition of a tacklebox, according to an embodiment of this disclosure;

FIG. 6 is a side view of a partition of a tacklebox, according to an embodiment of this disclosure; and FIG. 7 is an exploded view of a partition being inserted into a tacklebox, according to an embodiment of this disclosure.

Figure 1:
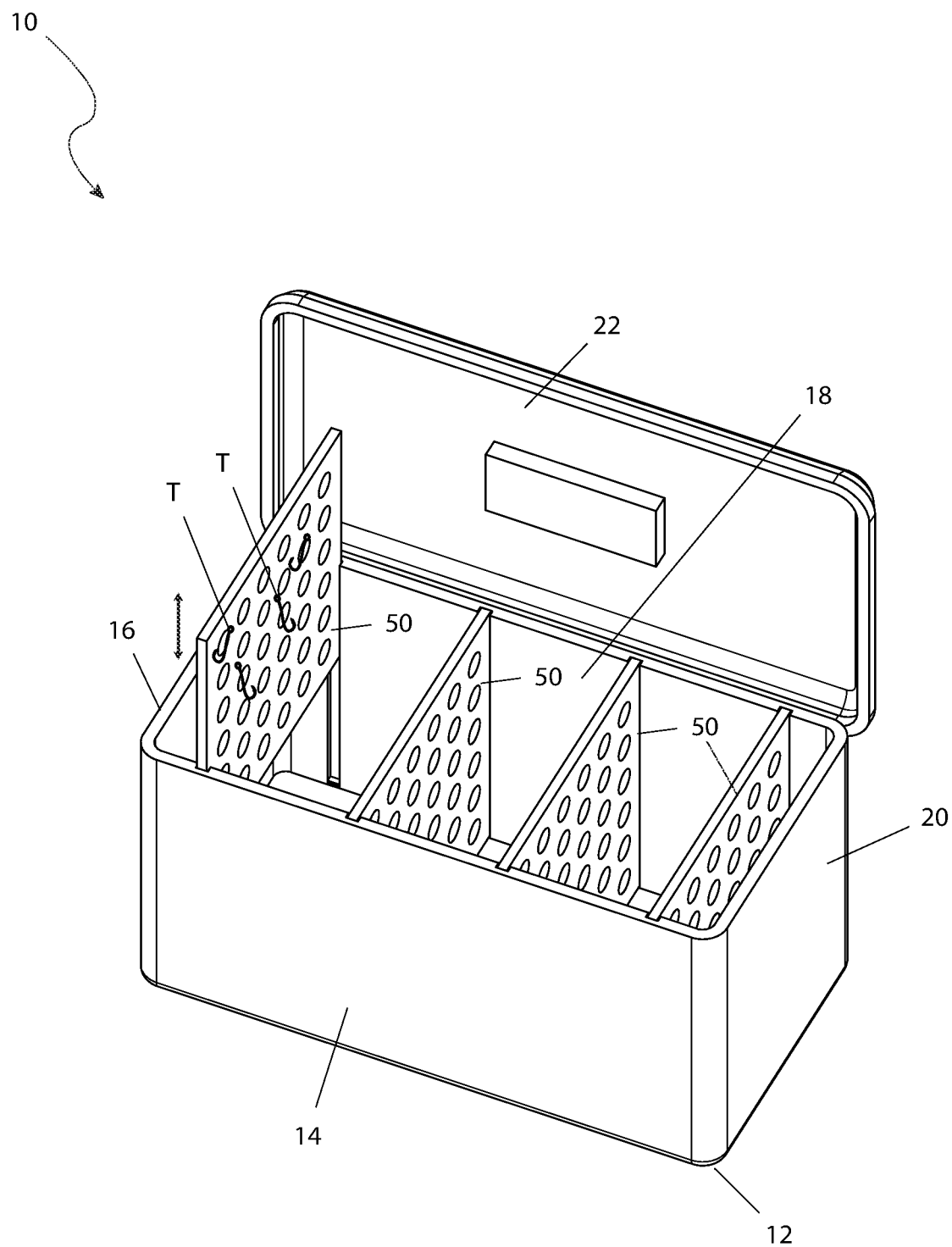
FIG. 1 is perspective view of a tacklebox, according to an embodiment of this disclosure.

DESCRIPTIVE KEY 10 tacklebox
12 base
14 first wall
16 second wall
18 third wall
20 fourth wall
22 lid
30 inner surface
32 cavity
36 first groove
38 first advancing means
40 groove surface
42 second groove
44 second advancing means
50 partition
52 partition first surface
54 partition second surface
56 partition first end
58 partition second end
60 magnet
T tackle

DETAILED DESCRIPTION

The following disclosure is provided to describe various embodiments of a tacklebox 10 configured to organize and safely store fishing tackle T.

Skilled artisans will appreciate additional embodiments and uses of the present invention that extend beyond the examples of this disclosure. Terms included by any claim that may be presented in any yet-to-be-filed non-provisional patent application are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one (1) of A, B, and C" should be read to permit any of A, B, or C singularly or in combination with the remaining elements. Additionally, such groups may include multiple instances of one (1) or more element in that group, which may be included with other elements of the group. All numbers, measurements, and values are given as approximations unless expressly stated otherwise.

Various aspects of the present disclosure will now be described in detail, without limitation. Skilled readers should not view the inclusion of any alternative labels as limiting in any way. Referring now to FIGS. 1-7, an illustrative tacklebox 10 will now be discussed in more detail.

FIG. 1 shows a tacklebox 10 including a base 12, a first wall 14, a second wall 16, a third wall 18, and a fourth wall 20, each of the walls 14, 16, 18, 20 having a bottom end attached to or otherwise affixed to the perimeter of the base 12 and upstanding therefrom. The first wall 14 and third wall 18 are parallel to each other, and the second wall 16 and fourth wall 20 are parallel to each other. All walls 14, 16, 18, 20 have a coextensive height. The tacklebox 10 includes a lid 22. In some embodiments, the lid 22 is connected with the top of the third wall 18 via a hinged connection. In some embodiments, the lid 22 may be integrally connected with the top of the third wall 18 or connected via a friction fit, pressure fit, mating engagement, dovetail connection, clips, barbs, tongue-in-groove, or threaded connection. The lid 22 may also be removably connected to or otherwise engage with the opposing top of the first wall 14 with such removable connection means such as magnetic and/or key/keyslot connection.

Figure 2:
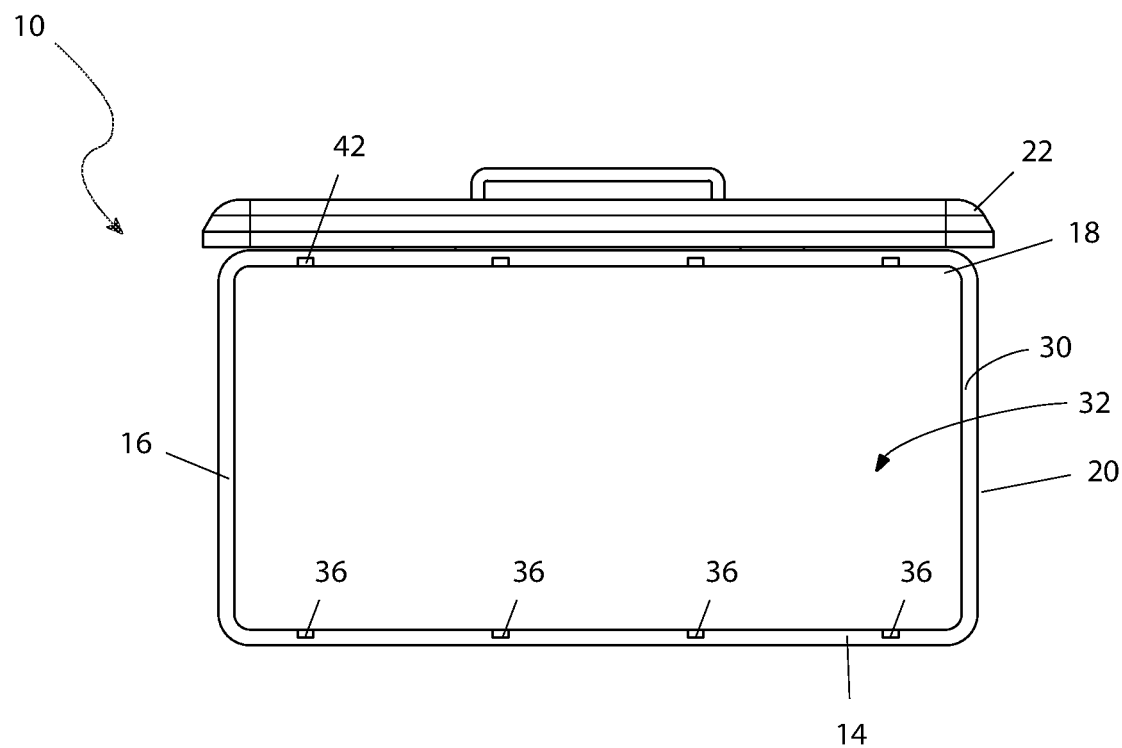
FIG. 2 is a top view of a tacklebox, according to an embodiment of this disclosure.

FIG. 2 shows the walls 14, 16, 18, 20 having a continuous flat and vertically planar inner surface 30 with a rounded portion. The boundaries of the inner surface 30 and a plane located at the coextensive upper perimeter edges of the walls 14, 16, 18, 20 (or the inner surface of the lid 22 when closed) defines a cavity 32. The cavity 32 is configured for disposal of at least one (1) partition 50, as described herein. This with partition the cavity 32 into multiple portions, or, when partitions 50 are removably placed therein, the portions can be compartmentalized.

Figure 3:
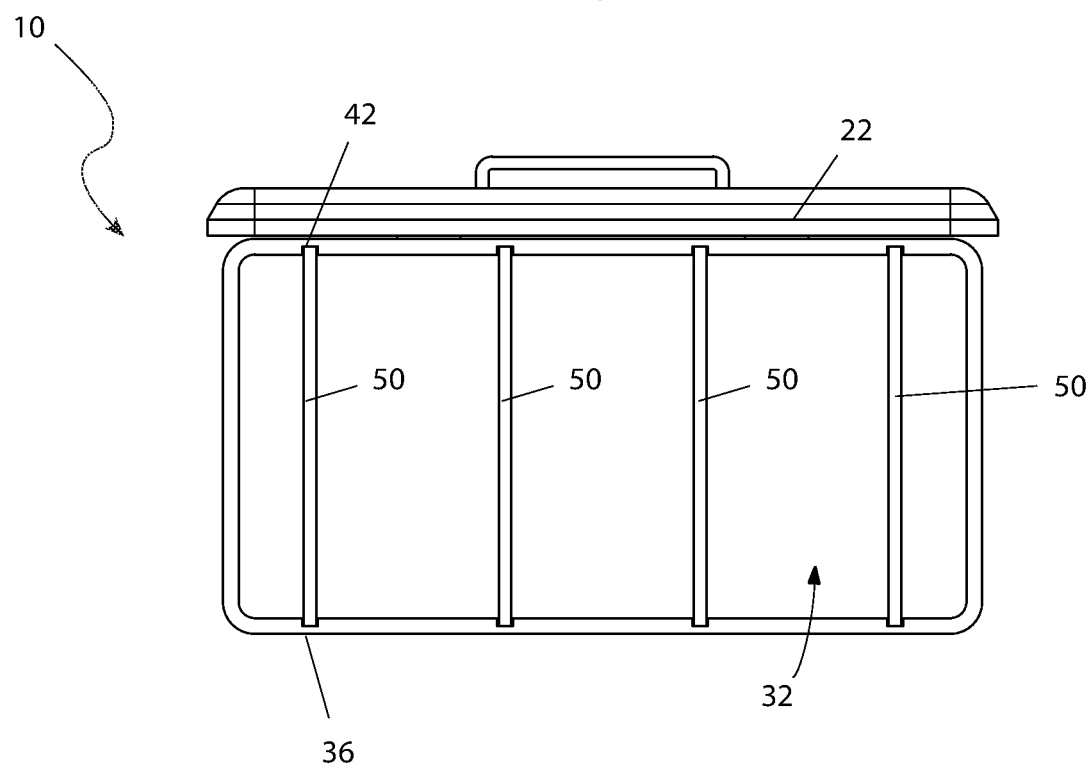
FIG. 3 is a cross-sectional view of a tacklebox, according to an embodiment of this disclosure.

In some embodiments, the inner surface 30 of the first wall 14 includes at least one (1) first groove 36, as shown in FIG. 3. Also shown in FIG. 3, is at least one (1) second groove 36 located on the inner surface 30 of the third wall 18. The first groove 36 extends vertically along the first wall 14 and extends to the base 12. The second groove 42 extends vertically along the inner surface 30 of the third wall 18. In the exemplary embodiment, the number of first grooves 36 and second grooves 42 are equal. Also in the exemplary embodiment, the first grooves 36 and second grooves 42 in coalignment and each are capable of receiving a portion of opposing sides of the partition 50.

Figure 4:
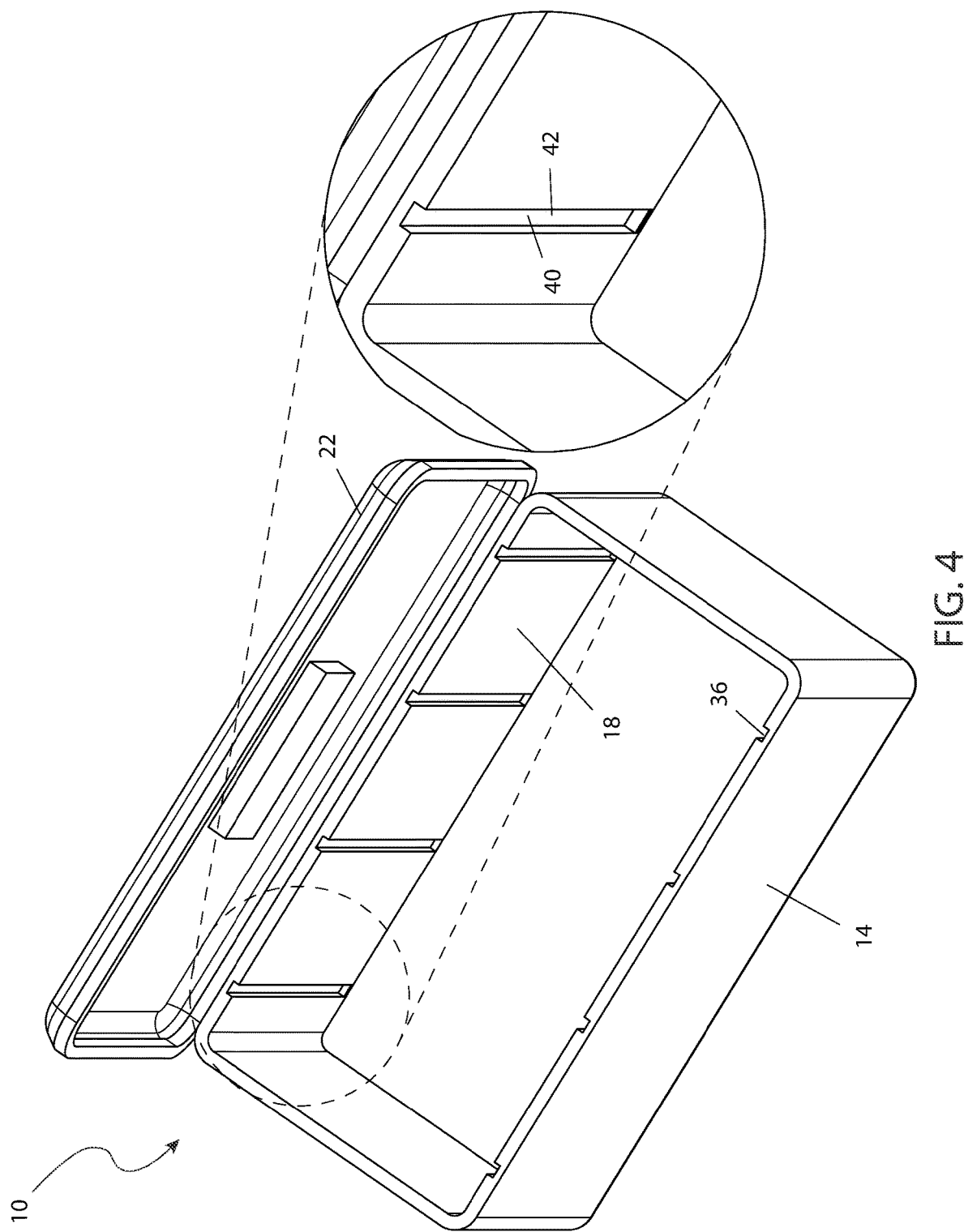
FIG. 4 is a top perspective view of a tacklebox, according to an embodiment of this disclosure.

FIG. 4 illustrates in more close detail, that the first grooves 36 and second grooves 42 each depend inwardly from the inner surface 30 to a coextensive depth. The shape and design of the groove surface 40, defined as the inner surface wall of the respective groove 36, 42, is preferably configured to snugly and securely fit the opposing sides of the partition 50. This illustration, combined with FIG. 7, show a particular matched individual pair of a first groove 36 and second groove 42. It also illustrates how the first groove 36 is configured to receive the corner of the engaging side of the partition first end 56 and the second groove 42 is configured to receive the corner of the engaging side of the partition second end 58. In this manner, the partition 50 can translate along the grooves 36, 42 and can engage with a respective first advancing means 38 or second advancing means 44 in order to "lock" the respective advancing means 38, 44.

FIGS. 5 and 6 show an exemplary partition 50 having a rectangular shape. In some embodiments, the partitions 50 may define various shapes, for example, oval, oblong, triangular, square, polygonal, irregular, uniform, non-uniform, variable, and/or tapered. The height and the width of the partitions 50 can be independently or coextensively configured to engage with the groove surface 40 or the inner surface 30 of the cavity 32. The exemplary partition 50 includes a partition first surface 52 and a partition second surface 54 each extending between a partition first end 56 and a partition second end 58.

The partition first surface 52 and/or the partition second surface 54 includes a plurality of magnets 60. The magnets 60 are preferably permanent magnets, for example, neodymium magnets. In a preferred embodiment, the magnets 60 are embedded fully within the partition 50 such that the partition first surface 52 and partition second surface 54 is planar. This can prevent any rusting, weathering, or damage to the magnets 60. Other embodiments comprise that either the magnets 60 are attached to or partially embedded within the respective partition first surface 52 and/or partition second surface 54. The magnets 60 are smaller in shape, such that multiple magnets 60 can be disposed on either the partition first surface 52 and/or the partition second surface 54. The size of the magnets 60 will allow the tacklebox 10 to maintain a lighter weight when releasably fixing tackle T to any number of partitions 50 releasably placed within the first grooves 36 and second grooves 42. In the preferred embodiment, the magnets 60 are arranged in a six by six (6:6) matrix. The partition 50 is configured to prevent tackle T from shifting in the tacklebox 10 during transport and use.

Referring now more closely to FIG. 7, an embodiment of the tacklebox 10 provides for a first advancing means 38 and a second advancing means 44 for the aid in releasing a particular partition 50 from a particular matched individual pair of the first grooves 36 and second grooves 42. The first groove 36 extends downward to the base 12, where a first advancing means 38 is located. In an exemplary embodiment, the first advancing means 38 is defined as a spring-lock device that has a plate at the top that can motion outward through the first groove 36. The first advancing means 38 is biased so as to be operably oriented between a compressed secure orientation and an expanded release orientation. Similarly, the second groove 42 extends downward to the base 12, where a second advancing means 44 is located. In an exemplary embodiment, the second advancing means 44 is defined as a spring-lock device that has a plate at the top that can motion outward through the second groove 42. The second advancing means 44 is biased so as to be operably oriented between a compressed secure orientation and an expanded release orientation. The first advancing means 38 and second advancing means 44 can work in tandem when coincidentally engaged by the partition 50, or independently therefrom.

In use, the partition 50 is motioned outward by direct engaging force from the first advancing means 38 and/or second advancing means 44. The direct engaging force is a reactionary force delivered by result of an initial pressing force of the partition 50 down against the first advancing means 38 and/or second advancing means 44. The direct and engaging force can forcefully transition to the expanded release orientation and force outward any item, such as engaging portions of the partition 50, through the respective groove 36, 42. The direct engaging force can be slight or moderate depending on the individual spring force of the first advancing means 38 and second advancing means 44, but not envisioned to be such that it causes injury or damage to the environment or material of the tacklebox 10 and partition 50.

Tackle T can be placed on the magnets 60 embedded in the partition first surface 52 and/or the partition second surface 54 such that the tackle T is securely attached to and may coincidentally travel with movement of the partition 50, as shown in FIG. 1. The partition 50 can be reinserted into the tacklebox 10 by sliding along the first and second grooves 36, 42 and providing another initial pressing force from the partition 50 inward to engage the first advancing means 38 and second advancing means 44 to the compressed secure orientation. When tackle T is needed the user can remove the tackle T from the magnets 60 of the partition 50 by pulling the tackle T and overcoming the magnetic force.

While various aspects of the present invention have been described in the above disclosure, the description of this disclosure is intended to illustrate and not limit the scope of the invention. The invention is defined by the scope of the claims of a corresponding nonprovisional utility patent application and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the claims of a corresponding nonprovisional utility patent application.

What is claimed is:

1. A tacklebox, comprising:
   a base;
   a first wall, a second wall, a third wall, and a fourth wall, each having a bottom end affixed to the base and extending upward therefrom, the first and third walls being parallel to each other, and the second and fourth walls being parallel to each other, each of the first, second, third, and fourth walls having a continuous flat and vertically planar inner surface with a rounded portion and a coextensive height;
   a lid connected to a top edge of the third wall;
   a cavity defined by the base, the inner surfaces of the walls, and the lid;
   a first groove disposed on the inner surface of the first wall, and a second groove disposed on the inner surface of the third wall, the first and second grooves being in vertical alignment and extending from an upper end toward the base, each groove having an inner groove surface;
   a partition having a first end and a second end opposite the first end, the first end being received within the first groove and the second end being received within the second groove, wherein each of the grooves securely and snugly receives a corresponding end of the partition;
   a spring-lock device disposed at a bottom of each of the first groove and the second groove, each spring-lock device including a plate configured to be actuated outwardly from a secure position to a release position in response to pressure from the partition to enable removal of the partition from the grooves; and,
   a plurality of embedded magnets disposed on a first surface and a second surface of the partition, the magnets being fully embedded within the partition such that the first and second surfaces are planar and configured to releasably secure fishing tackle to the partition.

2. The tacklebox of claim 1, wherein the magnets on the partition are permanent neodymium magnets arranged in a six-by-six matrix on at least one of the first surface and the second surface of the partition.

\* \* \* \* \*